United States Patent
Knight (10) Patent No.: US 7,920,396 B2
(45) Date of Patent: Apr. 5, 2011

(54) SYNCHRONOUS RECTIFIER AND CONTROLLER FOR INDUCTIVE COUPLING

(75) Inventor: Jonathan Robert Knight, Tokyo (JP)

(73) Assignee: National Semiconductor Corporation, Santa Clara, CA (US)

( * ) Notice: Subject to any disclaimer, the term of this patent is extended or adjusted under 35 U.S.C. 154(b) by 593 days.

(21) Appl. No.: 11/777,710

(22) Filed: Jul. 13, 2007

(65) Prior Publication Data

US 2009/0016090 A1 Jan. 15, 2009

(51) Int. Cl.
*H02M 7/217* (2006.01)
(52) U.S. Cl. ...................................................... 363/127
(58) Field of Classification Search .................. 323/235, 323/282, 283, 351; 363/125, 127
See application file for complete search history.

(56) References Cited

U.S. PATENT DOCUMENTS

| | | | | |
|---|---|---|---|---|
| 5,045,770 | A | 9/1991 | Brooks | 323/223 |
| 5,903,134 | A | 5/1999 | Takeuchi | 320/108 |
| 5,959,433 | A | 9/1999 | Rohde | 320/108 |
| 5,994,882 | A * | 11/1999 | Ma | 323/222 |
| 6,426,884 | B1 * | 7/2002 | Sun | 363/17 |
| 6,705,441 | B1 * | 3/2004 | Boys et al. | 191/10 |
| 6,912,137 | B2 | 6/2005 | Berghegger | 363/21.03 |
| 7,164,255 | B2 | 1/2007 | Hui | 320/108 |
| 2005/0040800 | A1 | 2/2005 | Sutardja | |

FOREIGN PATENT DOCUMENTS

| | | |
|---|---|---|
| JP | 2007-014059 | 1/2007 |
| KR | 1020000071270 A | 11/2000 |
| KR | 1020060000300 A | 1/2006 |
| KR | 1020070064654 A | 6/2007 |

OTHER PUBLICATIONS

Yasuyuki Nishida, "A Predictive Instantaneous-Current PWM Controlled Rectifier with AC-Side Harmonic Current Reduction," *IEEE*, Jun. 1997, pp. 337-343.
"Method for Inductive Charging of a Headset Battery Using the Speaker Coil," ip.com, www.priorartdatabase.com/IPCOM/000011872 , last viewed Mar. 28, 2008, 2 pp.
Franz-Xaver Arbinger et al., "Wireless Battery Charger Chip for Smart-Card Applications," http://www.iis.fraunhofer.de/Images/paper_wireless_battery_charger_tcm97-73299.pdf , last viewed Mar. 28, 2008, 5 pp.
Herschell Taghap "SplashPad: Cut the power cords," *Ars Technica, LLC*, Oct. 2, 2005, 3pp.
Office Action dated Jul. 16, 2010 in connection with Korean Patent Applictaion No. 10-2008-67533.

* cited by examiner

*Primary Examiner* — Adolf Berhane (57) ABSTRACT

A synchronous rectifier is arranged to rectify inductively coupled power using FETs (field effect transistors) to minimize the voltage drop of the rectifier, which minimizes power loss. Power loss is an important consideration in applications where fairly significant power is coupled to a device (such as a battery charger or other energy storage device) for a fairly short time (such as less than one hour) at a fairly low voltage (such as around 2.5 to 4.5 volts). Body diodes of the FETs can be used to supply power for bootstrapping and control logic for controlling the FETs.

20 Claims, 6 Drawing Sheets

SYNCHRONOUS RECTIFIER AND CONTROLLER FOR INDUCTIVE COUPLING

FIELD OF THE INVENTION

The present disclosure generally relates to alternating current rectification. More particularly, the present disclosure relates to synchronous rectification of inductively coupled power.

BACKGROUND

Power control in battery-powered mobile devices is of increased concern in recent times. Most battery-powered mobile devices use a voltage regulator that can both limit and regulate power that is being supplied to the various electronic circuits in the device. Examples of battery-powered mobile devices include personal data assistants (PDAs), cellular telephones, portable messaging devices for email and text messages, digital cameras, personal music player devices, and others.

Various circuit arrangements have also been made for charging the battery and otherwise powering the portable device. For example, a coil in the battery-powered mobile device can be used to inductively generate a sinusoidal signal that is then rectified by a full-wave rectifier to generate a direct current (DC) voltage. The DC voltage is then filtered and regulated, for example, by a low dropout (LDO) voltage regulator to produce a regulated 5 volt source for powering the electronic circuits in the device.

Conventional full-wave bridge rectifiers utilize junction diodes. Each junction diode has a forward bias voltage drop of approximately 0.7V. Thus, for a full-wave bridge rectifier, the resulting voltage drop relative to the input voltage can be as high as 1.4 volts. A voltage drop of 450 millivolts can also be present across the LDO voltage regulator. Both of these voltage drops can generate an amount of heat that is often undesired.

BRIEF DESCRIPTION OF THE DRAWINGS

Non-limiting and non-exhaustive embodiments are described with reference to the following drawings.

DETAILED DESCRIPTION

Various embodiments will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," and "the" may include reference to both the singular and the plural. The meaning of "in" may include "in" and "on." The term "connected" may mean a direct electrical, electro-magnetic, mechanical, logical, or other connection between the items connected, without any electrical, mechanical, logical or other intermediary therebetween. The term "coupled" can mean a direct connection between items, an indirect connection through one or more intermediaries, or communication between items in a manner that may not constitute a connection. The term "circuit" can mean a single component or a plurality of components, active and/or passive, discrete or integrated, that are coupled together to provide a desired function. The term "signal" can mean at least one current, voltage, charge, data, or other such identifiable quantity Briefly stated, the present disclosure generally relates to synchronous rectification of inductively coupled power. Inductively coupled power can be rectified using FETs (field effect transistors) to minimize the voltage drop of the rectifier, which minimizes power loss. Power loss is an important consideration in applications where fairly significant power is coupled to a device (such as a battery charger or other energy storage device) for a fairly short time (such as less than one hour) at a fairly low voltage (such as around 2.5 to 4.5 volts). Body diodes of the FETs can be used to supply power for bootstrapping and control logic for controlling the FETs.

Figure 1:
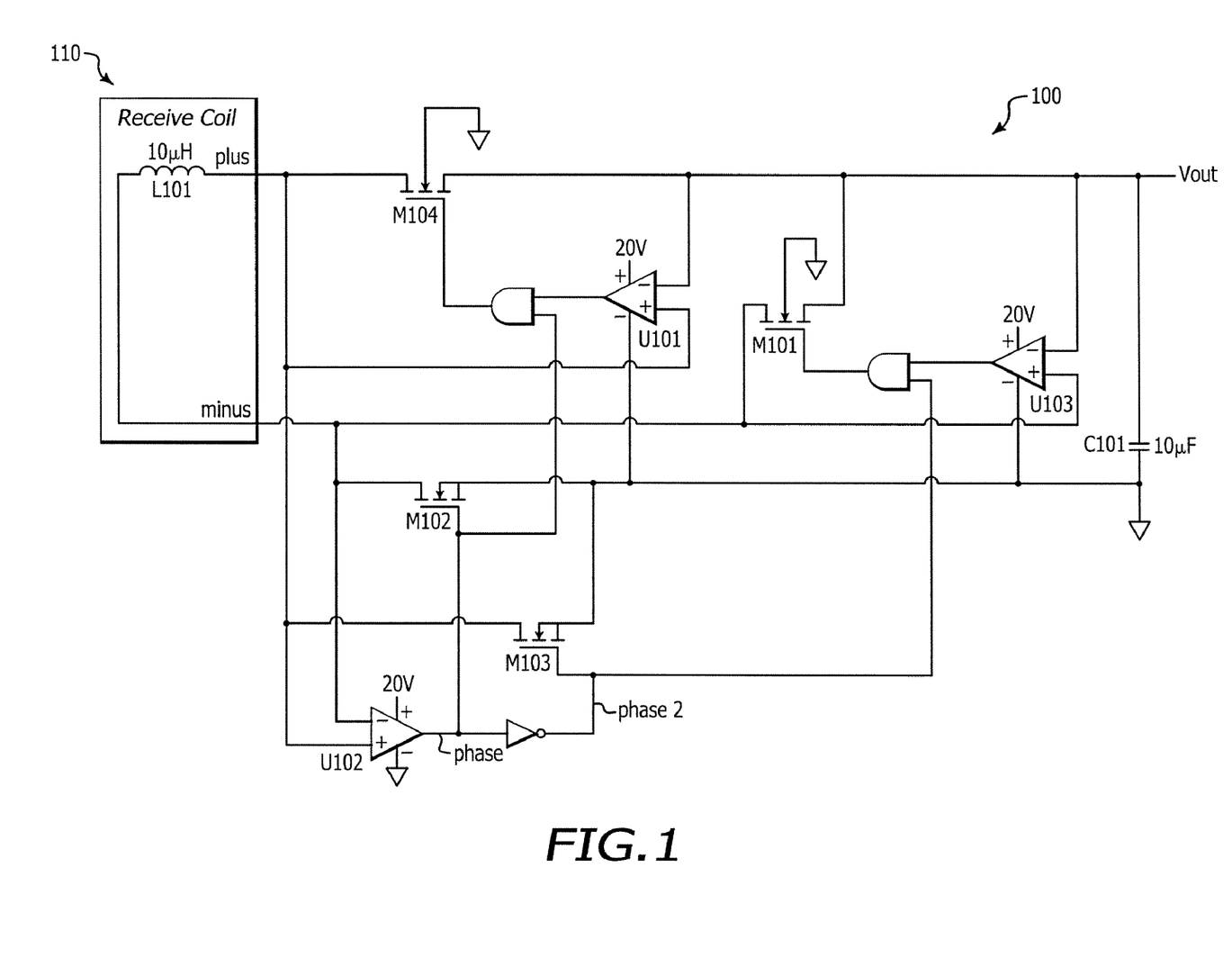
FIG. 1 is a schematic diagram illustrating a synchronous rectifier and controller for inductive coupling of power.

FIG. 1 is a schematic diagram illustrating a synchronous rectifier and controller for inductive coupling of power. Circuit 100 receives power from receive coil L101. Receive coil L101 can be a receive coil from a telephone 110. The output voltage of the receive coil L101 is sinusoidal (because of the inductive coupling), so rectification, peak detection and filtering is typically performed by circuit 100 (in a similar fashion to rectification and filtering in a conventional AC supply).

In operation, zero-crossing detection comparator U102 is used to detect a zero crossing on power signals "plus" and "minus." In response to a detection of a zero-crossing, signals are generated to turn on an appropriate low-side switch. For example, when a positive-going zero crossing is detected, comparator U102 activates plus phase low-side switch M102. When a negative zero crossing is detected, comparator U102 activates minus phase low-side switch M103.

High-side switches M101 and M104 are enabled in response to the output of the zero-crossing detection comparator U102 as well as the as phase rectifier comparators U101 and U103. For example, plus phase high-side switch M104 conducts when the output of the zero-crossing detection comparator U102 indicates a positive-going zero crossing (e.g., signal "phase" is asserted) and the plus phase rectifier comparator U101 indicates that signal "plus" is greater than "Vout." Minus phase high-side switch M101 conducts when the output of the zero-crossing detection comparator U102 indicates a negative-going zero crossing is detected (e.g., signal "phase2", an inverse of signal "phase", is asserted) and the minus phase rectifier comparator U103 indicates that signal "minus" is greater than "Vout." Thus the comparators are used to compare the output capacitor C101 with each phase voltage and will be high whenever the phase voltage is higher.

Power for low-voltage control circuitry can be derived by using a passive bridge rectifier driving a series regulator. In another example, the synchronously-rectified phase voltage in FIG. 1 can be used to supply power to another series regulator. The output of these two regulators can be tied in parallel to provide power for the control circuits. As described below with reference to FIGS. 3-6, body diodes that are inherent in the rectifier FETs can also be used as the passive bridge rectifier. Thus, a single LDO supplied from the output of the synchronous rectifier can be used to supply power to the control circuitry when body diodes of the rectifier FETs are used.

Drive voltage for the NMOS synchronous rectifier FETs can be derived from a bootstrap supply such as provided from a capacitor, which can be supplied externally to an integrated circuit that implements circuit 100. Depending on processing technology of the integrated circuit, PFETs can be used, which do not necessarily need the bootstrap supply.

The above circuit is normally used to replace the conventional passive diode bridge rectifier, which is responsible for approximately 1.4V of drop during conduction. The voltage drop across the FET switches is determined by their Rds-on, but is typically be reduced to 200 mV (or less) with a 500 mA load current and for typical switch sizes.

The output voltage normally depends on the degree of coupling between the charging coil (charging station) and the receive coil (inside the phone or other portable device) and the load current. A considerable amount of open-circuit voltage is usually dropped across the leakage inductance (shown as L101 at 10 μH in FIG. 1) of the transformer which can be formed using charge and receive coils (such as receive coil L101).

The leakage inductance of the "temporary" transformer (which usually comprises the coil in the charging station and the coil in the equipment with the battery to be charged) is often relatively large. The relatively large leakage inductance of the transformer causes the output voltage of the rectifier to go up in response to a reduction of the load current. For this reason, using a buck switching regulator instead of a linear regulator/LDO can save very significant amounts of power and avoid generation of heat when the load is less than a maximum expected value.

The combination of using the synchronous rectifier to minimize voltage drop at varying load currents, and by using a buck switching regulator (as described below) to minimize power loss at less than maximum load currents yields more efficient power transference than do conventional power transfer systems. Minimizing power dissipation is typically even more efficient at lighter load currents.

A buck switching regulator can be supplied by the rectifier circuit to regulate the output voltage down to an appropriate value for a battery charging system. In another example, a buck converter can be configured to charge the battery directly by designing it to operate in constant current or constant voltage mode, in response to a charging state of the battery.

Additionally, power storage devices other than batteries can be charged by circuit 100. For example, capacitors and fuel cells can be charged efficiently. Power loss can be significantly lowered in applications where fairly significant power is coupled to a device for a fairly short time (such as less than one hour) at a fairly low voltage (such as around 2.5 to 4.5 volts.

Figure 2:
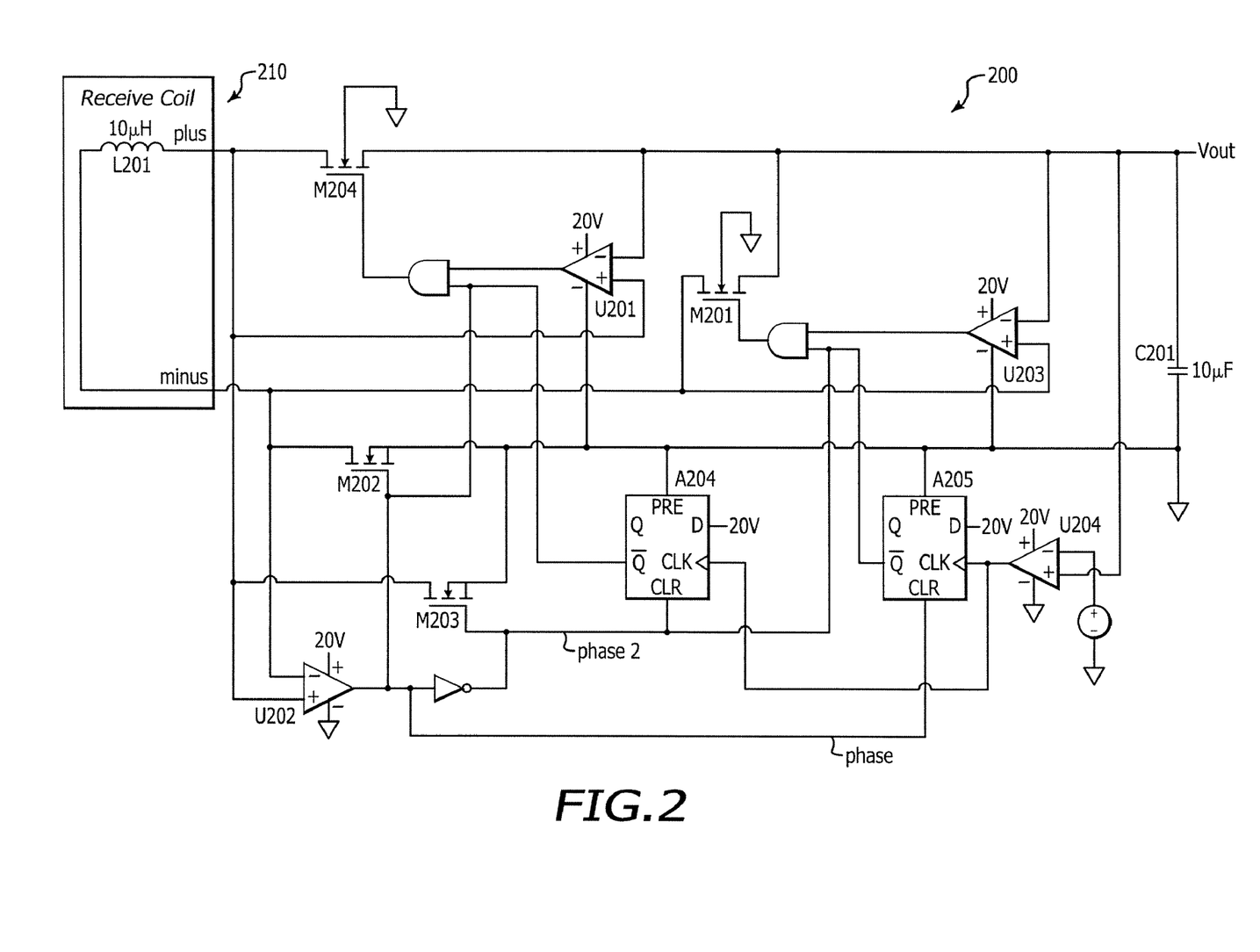
FIG. 2 is a schematic diagram illustrating another synchronous rectifier and controller for inductive coupling of power.

FIG. 2 is a schematic diagram illustrating another synchronous rectifier and controller for inductive coupling of power. In this example, rectification and regulation are combined into one function and performed with the rectifier switches M201-M204. Circuit 200 receives power from receive coil L201, which drives power signals "plus" and "minus."

In operation, zero-crossing detection comparator U202 is used to detect a zero crossing on the power signals "plus" and "minus". In response to a detection of a zero-crossing on the power signals, signals "phase" and "phase2" are generated to turn on an appropriate low-side switch. For example, when a positive-going zero crossing is detected, comparator U202 activates plus phase low-side switch M202 via signal "phase". When a negative zero crossing is detected, comparator U202 activates minus phase low-side switch M203 via signal "phase2".

High-side switches are enabled in response to the output of the zero-crossing detection comparator U202 as well as the as phase rectifier comparators U201 and U203. For example, plus phase high-side switch M204 conducts when the output of the zero-crossing detection comparator U202 indicates a positive-going zero crossing is detected (e.g. signal "phase" is asserted) and the plus phase rectifier comparator U201 indicates that signal "plus" is greater than "Vout." Minus phase high-side switch M201 conducts when the output of the zero-crossing detection comparator U202 indicates a negative-going zero crossing is detected (e.g. signal "phase 2", an inverse of signal "phase", is asserted) and the minus phase rectifier comparator U203 indicates that signal "minus" is greater than "Vout." Thus the comparators are used to compare the output capacitor C201 with each phase voltage and will be high whenever the phase voltage is higher.

Comparator U204 compares the filtered output voltage (Vout) to a reference voltage (for example, 5V as shown in FIG. 2). Thus an additional condition is used in order to turn on the high-side switches. The phase voltage is normally kept above the output voltage and the output voltage is normally kept below the reference voltage. Latches such as A204 and A205 can be used to prevent potential "chattering" (such as frequent on/off switching of the rectifier phase switches) and is not necessary in every implementation.

As in circuit 100, circuit 200 can be used to provide the battery charge function by forcing the regulator to charge the battery directly. Constant current mode charging can be implemented by sensing load current and turning off the high-side switches, rather than sensing the output voltage and actuating the high-side switches to control the charging.

Figure 3:
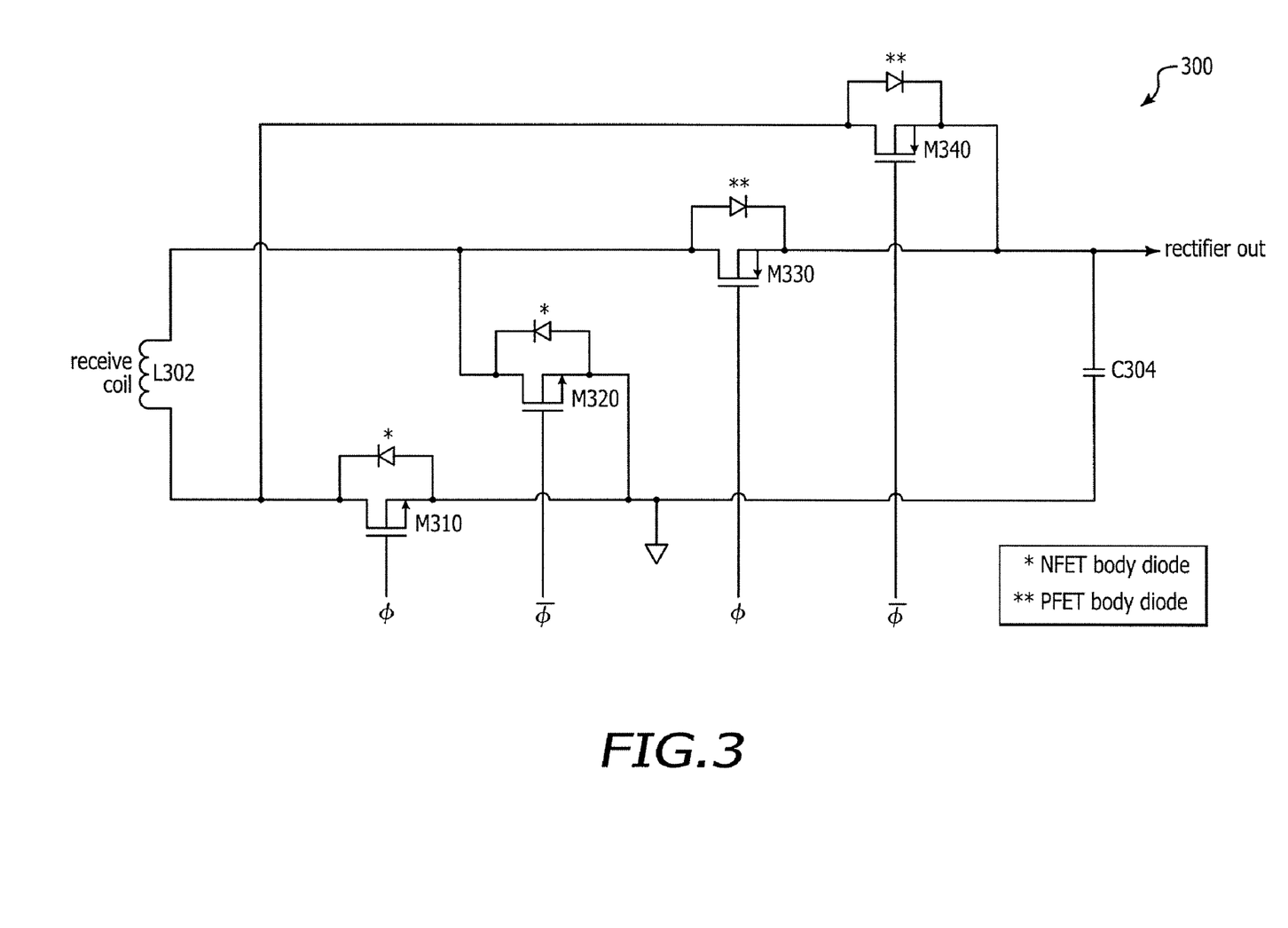
FIG. 3 is a schematic diagram illustrating the use of NFET transistors for low-side rectification and PFET transistors for high-side rectification.

FIG. 3 is a schematic diagram illustrating the use of NFET transistors for low-side rectification and PFET transistors for high-side rectification. Circuit 300 comprises receive coil L302, NFET transistors M310 and M320, PFET transistors M330 and M340, and capacitor C304.

Circuit 300 can be fabricated using a single P-epitaxial CMOS monolithic process or by using discrete FET transistors. In both examples, the body diodes of the FETs can be used to function as passive rectifiers such that a source of power is provided for the gate drive and control circuitry. Likewise, the body diodes of the FETs can be used to prevent voltage spikes that could possibly damage the FETs when they are switched off. If an N-epitaxial process is used, then an isolation option (such as isolated wells) for the PFETs is normally used.

Figure 4:
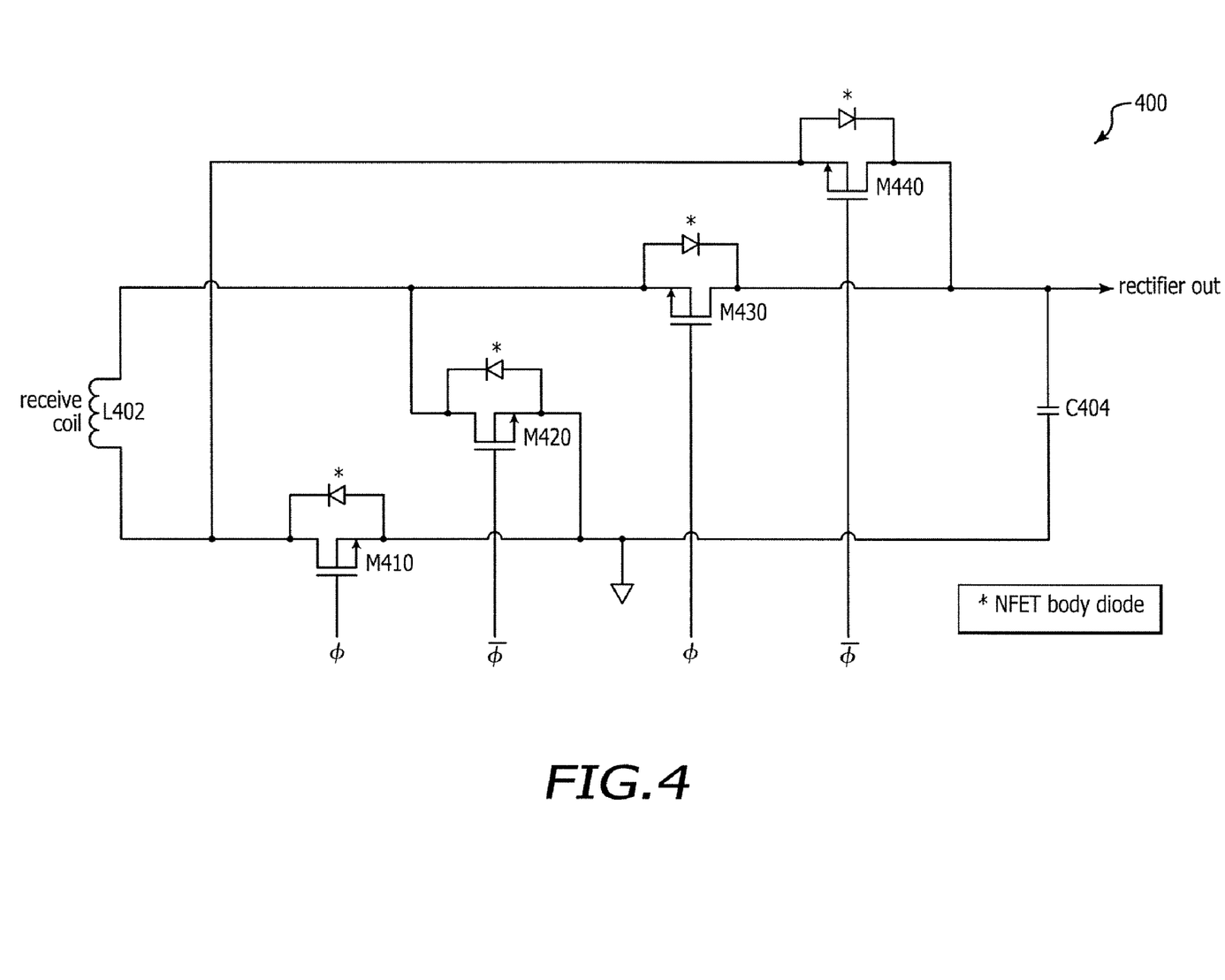
FIG. 4 is a schematic diagram illustrating the use of NFET transistors being used for both low-side- and high-side-switching.

FIG. 4 is a schematic diagram illustrating the use of NFETs being used for both low-side-switching and high-side-switching (which reduces gate drive current requirements and improves efficiency at light load currents). Circuit 400 comprises receive coil L402, NFET transistors M410, M420, M430, and M440, and capacitor C404.

Circuit 400 can be fabricated using a monolithic process to save die area (by eliminating isolation options, for example). Circuit 300 can be fabricated using the monolithic process or by using discrete power FETs. As illustrated above with respect to circuit 300, the body diodes of the FETs of circuit 400 form a passive bridge that provide a source of power for the gate drive and control circuitry. Circuit 400 can be implemented using bootstrap drive circuitry for the high-side FETs. The high-side FETS M430 and M440 are normally isolated from the substrate (depending on the process used).

Figure 5:
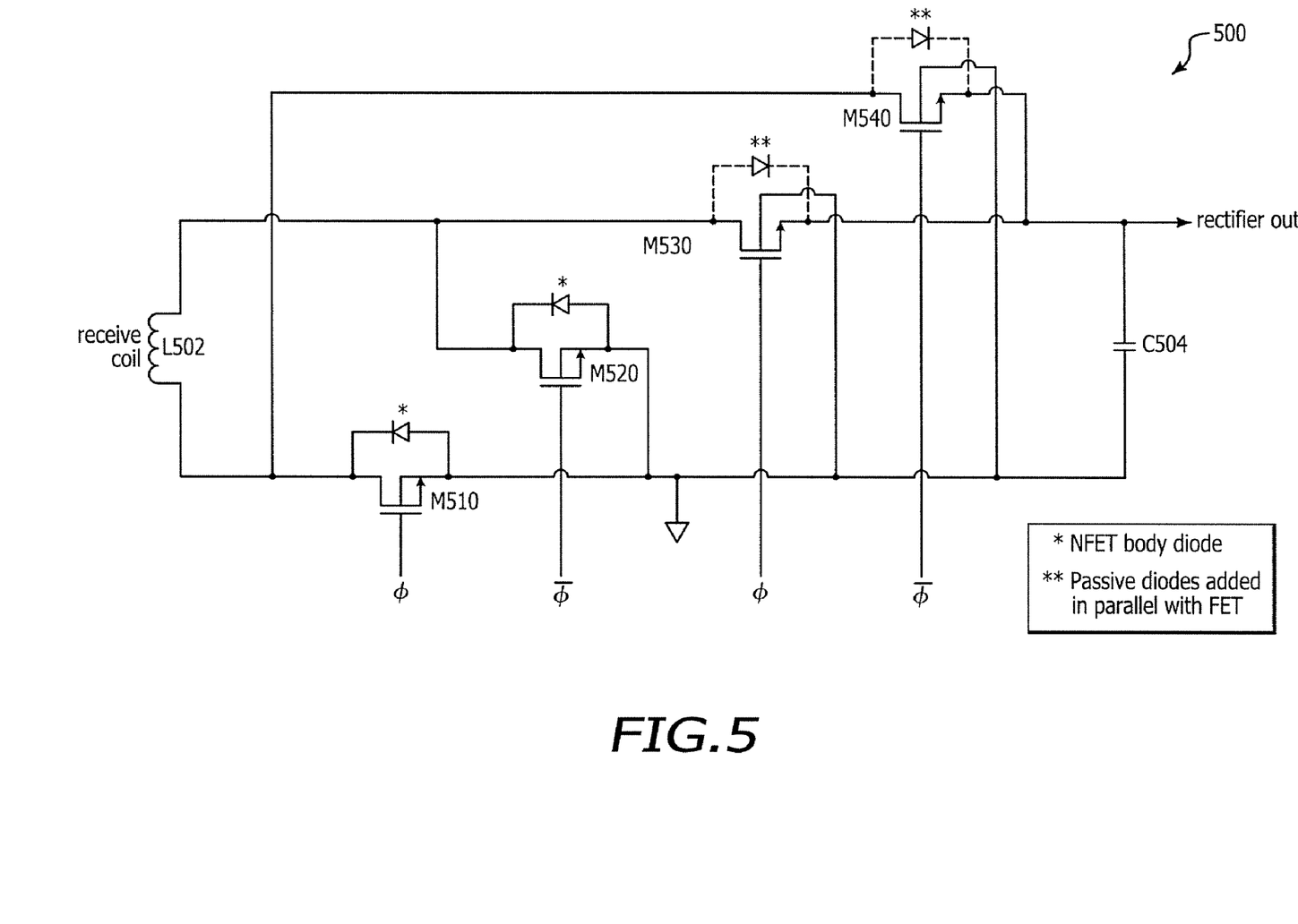
FIG. 5 is a schematic diagram illustrating the use of NFET transistors implemented using a monolithic process, but where the isolation of the NFET transistors from a P-epitaxial substrate is not desired.

FIG. 5 is a schematic diagram illustrating the use of NFETs implemented using a monolithic process, but where the isolation of the NFETs from the P-epitaxial substrate is not desired. Circuit 500 comprises receive coil L502, NFET transistors M510, M520, M530, and M540, and capacitor C504.

In circuit 500, the backgates of the high-side NFETs are the substrate itself. The passive diodes of the high-side NFETs are coupled in parallel with the Source/Drain junction of the high-side FETs in order to provide a source of power for the gate drive and control circuitry and to also prevent voltage spikes that could possibly damage the FETs when they are switched off.

Figure 6:
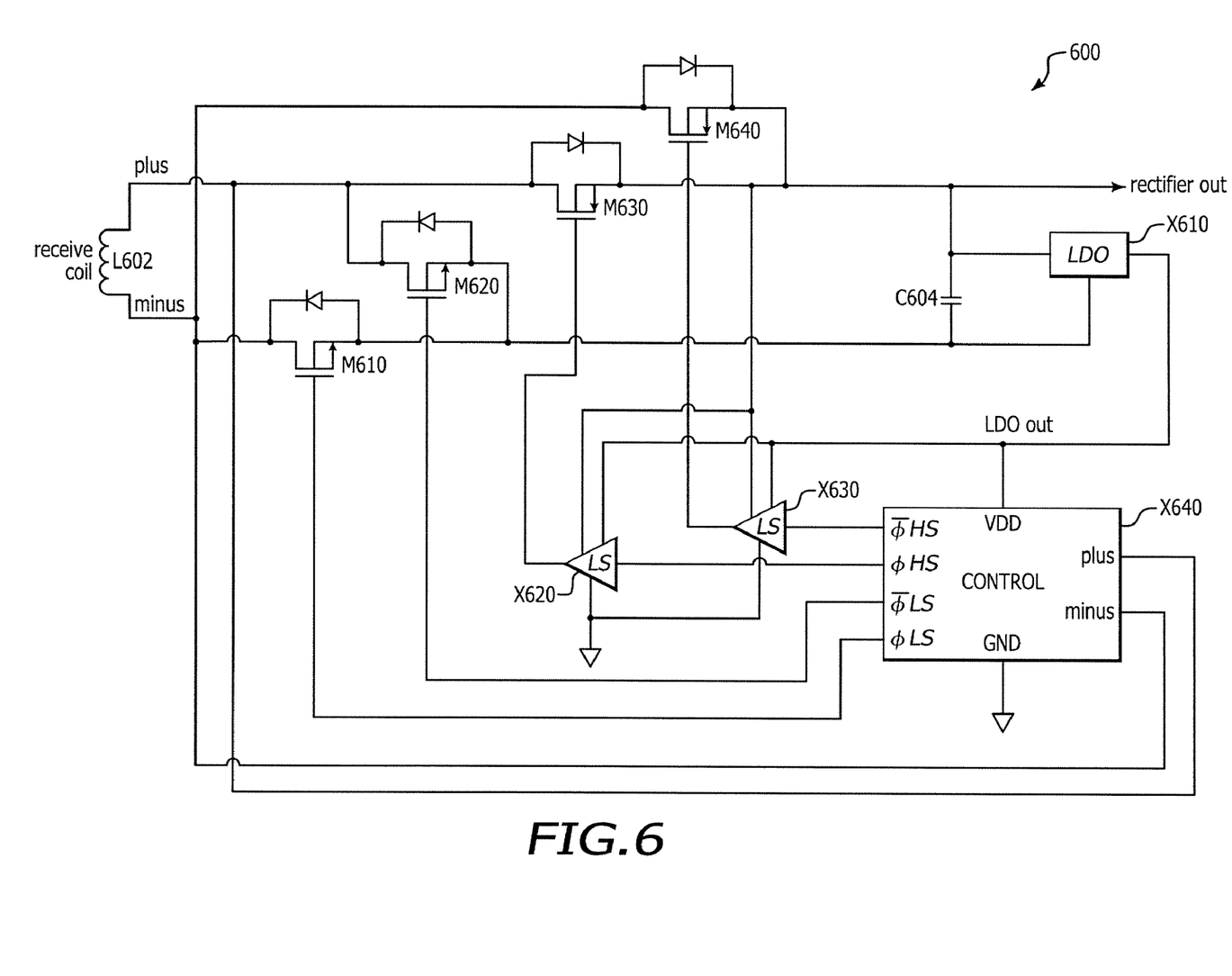
FIG. 6 is a schematic diagram illustrating gate driving circuitry and control circuitry powered by a synchronous rectifier.

FIG. 6 is a schematic diagram illustrating gate driving circuitry and control circuitry powered by a synchronous rectifier. Circuit 600 comprises receive coil L602, NFET transistors M610 and, M620, PFET transistors M630, and M640, LDO X610, comparators X620 and X630, control circuitry X640 and capacitor C604.

Circuit 600 comprises LDO X610 that is coupled between the output of the rectifier (which comprises the four body diodes illustrated by FETs M610, M620, M630, and M640) and the control circuitry X640. Because the output of the synchronous rectifier typically rises with decreasing load current, the LDO is used to maintain a supply of sufficiently low voltage to protect the low-voltage control circuitry. The full swing of the controlled LDO output voltage can be applied to the low-side NFET gates in many, if not all, implementations of the synchronous rectifier.

Level shifting circuitry can be used between the output of the control circuitry and the gates of the high-side rectifier FETs M630 and M640. Level shifting circuitry is often used because the gate drive swing must usually be larger than the output voltage of the LDO. For example, the gate drive swing can be up to the rectifier output voltage in the case of PFET high-side FETs and up to the bootstrap voltage in the case of NFET high-side FETs.

Although the invention has been described herein by way of exemplary embodiments, variations in the structures and methods described herein may be made without departing from the spirit and scope of the invention. For example, the positioning and/or sizing of the various components may be varied. Individual components and arrangements of components may be substituted as known to the art. Since many embodiments of the invention can be made without departing from the spirit and scope of the invention, the invention is not limited except as by the appended claims.

What is claimed is:

1. A synchronous switch circuit, comprising:
an inductor configured to generate an alternating current voltage in response to a received changing electromagnetic field;
a synchronous rectifier comprising first and second high side switches and first and second low side switches that are configured to rectify the alternating current voltage to produce a direct current voltage;
an energy storage device configured to store energy from the direct current voltage; and
control circuitry configured to control the first and second high side switches and the first and second low side switches in response to a state of the alternating current voltage.

2. The circuit of claim 1, wherein:
the first low side switch and the first high side switch are configured to be activated when the state of the alternating current voltage is a positive-going zero crossing; and
the second low side switch and the second high side switch are configured to be activated when the state of the alternating current voltage is a negative-going zero crossing.

3. The circuit of claim 2, wherein:
the first high side switch is configured to be activated when a voltage level of the alternating current voltage with a first polarity is greater than a voltage of a power terminal of the energy storage device; and
the second high side switch is configured to be activated when a voltage level of the alternating current voltage with a second polarity is greater than the voltage of the power terminal of the energy storage device.

4. The circuit of claim 3, wherein the control circuitry comprises a latch configured to latch a result of a comparison of the voltage level having the first polarity and the voltage of the power terminal of the energy storage device.

5. The circuit of claim 1, further comprising:
a regulator that is coupled to a power node of the energy storage device and configured to provide power for the control circuitry.

6. The circuit of claim 5, wherein the regulator comprises a low dropout voltage regulator.

7. The circuit of claim 5, wherein the regulator comprises a buck-boost switching regulator.

8. The circuit of claim 5, wherein:
each of the first and second low side switches comprises an NMOS transistor;
each of the first and second high side switches comprises a PMOS transistor;
the NMOS transistors comprise body diodes configured to perform low side rectification;
the PMOS transistors comprise body diodes configured to perform high side rectification; and
the NMOS and PMOS transistors are configured to perform the rectification to provide power to the power node of the energy storage device.

9. The circuit of claim 5, wherein:
each of the first and second low side switches and each of the first and second high side switches comprises an NMOS transistor;
the first and second high side switches are isolated from a substrate that is common with the first and second low side switches;
the NMOS transistors comprise body diodes configured to perform rectification; and
the NMOS transistors are configured to perform the rectification to provide power to the power node of the energy storage device.

10. The circuit of claim 5, wherein:
each of the first and second low side switches and each of the first and second high side switches comprises an NMOS transistor;
backgates of the first and second high side switches and backgates of the first and second low side switches are coupled to a common substrate;

each of the first and second high side switches comprises a body diode coupled across a source and a drain of that high side switch; and the body diodes are configured to perform rectification of the alternating current voltage so as to provide power to the power node of the energy storage device.

11. A method for synchronous rectification, comprising:
inductively coupling a power signal to first and second input terminals;
generating a direct current voltage by (i) activating a first low side switch and a first high side switch when a state of the power signal is a positive-going zero crossing and (ii) activating a second low side switch and a second high side switch when the state of the power signal is a negative-going zero crossing;
storing energy from the direct current voltage in an energy storage device; and
providing power from the energy storage device to control logic that activates the first and second high side switches and the first and second low side switches.

12. The method of claim 11, wherein the energy storage device comprises a capacitor.

13. The method of claim 11, wherein:
activating the first high side switch comprises activating the first high side switch when a voltage level at the first input terminal is greater than a voltage of a power terminal of the energy storage device; and
activating the second high side switch comprises activating the second high side switch when a voltage level at the second input terminal is greater than the voltage of the power terminal of the energy storage device.

14. The method of claim 11, further comprising:
regulating a voltage from the energy storage device to provide the power to the control logic.

15. The method of claim 11, wherein:
each of the first and second low side switches comprises an NMOS transistor;
each of the first and second high side switches comprises a PMOS transistor;
the NMOS transistors comprise body diodes that perform low side rectification;
the PMOS transistors comprise body diodes that perform high side rectification; and
the NMOS and PMOS transistors perform the rectification of the NMOS and PMOS to provide power to a power node of the energy storage device.

16. The method of claim 11, wherein:
each of the first and second low side switches and each of the first and second high side switches comprises an NMOS transistor;
the first and second high side switches are isolated from a substrate that is common with the first and second low side switches;
the NMOS transistors comprise body diodes that perform rectification; and
the NMOS transistors perform the rectification to provide power to a power node of the energy storage device.

17. The method of claim 11, wherein:
each of the first and second low side switches and each of the first and second high side switches comprises an NMOS transistor;
backgates of the first and second high side switches and backgates of the first and second low side switches are coupled to a common substrate;
each of the first and second high side switches comprises a body diode coupled across a source and a drain of that high side switch; and
the body diodes perform rectification of the alternating current voltage so as to provide power to a power node of the energy storage device.

18. A synchronous switch, comprising:
a means for inductively coupling a power signal to first and second input terminals;
a means for generating a direct current voltage by (i) activating a first low side switch and a first high side switch when a state of the power signal is a positive-going zero crossing and (ii) activating a second low side switch and a second high side switch when the state of the power signal is a negative-going zero crossing;
a means for storing energy from the direct current voltage; and
a means for providing power from the means for storing energy to control logic for activating the first and second high side switches and the first and second low side switches.

19. The synchronous switch of claim 18, wherein the means for storing energy comprises a capacitor.

20. The synchronous switch of claim 18, wherein:
body diodes of the first and second low side switches and body diodes of the first and second high side switches are configured to rectify the inductively coupled power signal to generate power for bootstrapping the control logic.

* * * * *